(12) United States Patent
Putz (10) Patent No.: US 11,597,451 B2
(45) Date of Patent: Mar. 7, 2023

(54) MULTIFUNCTIONAL TRACTION OR CARRIER VEHICLE

(71) Applicant: SYN TRAC GmbH, Bad Goisern (AT)

(72) Inventor: Stefan Putz, Bad Goisern (AT)

(73) Assignee: SYN TRAC GMBH, Bad Goisern (AT)

( * ) Notice: Subject to any disclaimer, the term of this patent is extended or adjusted under 35 U.S.C. 154(b) by 307 days.

(21) Appl. No.: 16/870,591

(22) Filed: May 8, 2020

(65) Prior Publication Data

US 2020/0269937 A1 Aug. 27, 2020

Related U.S. Application Data

(63) Continuation of application No. PCT/EP2018/080815, filed on Nov. 9, 2018.

(30) Foreign Application Priority Data

Nov. 10, 2017 (DE) .......................... 102017126475.2

(51) Int. Cl.
*B62D 49/06* (2006.01)
*A01B 76/00* (2006.01)
(Continued)

(52) U.S. Cl.
CPC .............. *B62D 49/06* (2013.01); *A01B 76/00* (2013.01); *B60K 17/28* (2013.01); *B62D 21/16* (2013.01); *B62D 21/186* (2013.01); *B62D 25/082* (2013.01); *F16H 57/02* (2013.01); *F16H 57/0415* (2013.01); *F16H 2057/02043* (2013.01)

(58) Field of Classification Search
CPC .... B62D 21/10; B62D 49/06; B62D 49/0657; B62D 25/082; B60K 17/28; B60K 11/02; B60K 11/04; F16H 57/0415
See application file for complete search history.

(56) References Cited

U.S. PATENT DOCUMENTS 3,613,816 A * 10/1971 Gutbrod ............. B62D 49/0635
180/234
3,921,742 A * 11/1975 May ....................... B62D 49/06
180/234

(Continued)

FOREIGN PATENT DOCUMENTS

AT    514147 A1   10/2014
DE   3222792 A1   12/1983
(Continued)

OTHER PUBLICATIONS

International Search Report and Written Opinion for International Application No. PCT/EP2018/080815 dated Mar. 1, 2019.

*Primary Examiner* — Frank B Vanaman
(74) *Attorney, Agent, or Firm* — Stephen J. Kenny; Vincenzo DiMonaco; Foley Hoag LLP (57) ABSTRACT

In accordance with the disclosure provision is made for a vehicle. The vehicle is characterized in that a vehicle chassis of this vehicle includes a roughly tubular frame, a gearbox housing and underbody paneling. The frame, the gearbox housing and the underbody paneling are connected in such a manner that they form the vehicle chassis and hence a load-bearing frame for engine, bodywork and/or payload.

9 Claims, 4 Drawing Sheets

(51) Int. Cl.
*B60K 17/28* (2006.01)
*B62D 21/16* (2006.01)
*B62D 21/18* (2006.01)
*B62D 25/08* (2006.01)
*F16H 57/02* (2012.01)
*F16H 57/04* (2010.01)

(56) References Cited

U.S. PATENT DOCUMENTS

| | | | | |
|---|---|---|---|---|
| 4,450,925 A * | 5/1984 | Gardner | | B62D 21/186 |
| | | | | 172/98 |
| 4,585,084 A * | 4/1986 | van der Lely | | B62D 49/002 |
| | | | | 180/53.7 |
| 4,765,637 A * | 8/1988 | van der Lely | | B62D 49/02 |
| | | | | 172/47 |
| 5,660,428 A * | 8/1997 | Catlin | | B62D 65/00 |
| | | | | 296/205 |
| 5,687,809 A * | 11/1997 | Braud | | B60K 17/04 |
| | | | | 180/297 |
| 6,668,964 B2 * | 12/2003 | Braud | | B60K 17/04 |
| | | | | 180/292 |
| 6,916,148 B2 * | 7/2005 | Brown | | E02F 9/166 |
| | | | | 180/68.1 |
| 2001/0014277 A1 | 8/2001 | Braud | | |
| 2003/0156937 A1 | 8/2003 | Brown et al. | | |
| 2004/0150209 A1 * | 8/2004 | Valdez | | B62D 21/00 |
| | | | | 280/781 |
| 2005/0161267 A1 * | 7/2005 | Elson | | B62D 21/16 |
| | | | | 180/69.5 |
| 2008/0179870 A1 * | 7/2008 | Theodore | | B60K 17/34 |
| | | | | 280/786 |
| 2010/0263958 A1 | 10/2010 | Kochidomari et al. | | |
| 2012/0175863 A1 * | 7/2012 | Theodore | | B62D 21/04 |
| | | | | 29/469 |
| 2016/0052563 A1 | 2/2016 | Scharmuller et al. | | |
| 2020/0269937 A1 | 8/2020 | Putz | | |

FOREIGN PATENT DOCUMENTS

| | | |
|---|---|---|
| DE | 10200742599 A1 | 3/2009 |
| EP | 2978299 A1 | 2/2016 |
| JP | S6365572 U | 4/1988 |
| JP | H048675 A | 1/1992 |
| JP | 2010/247671 A | 11/2010 |
| WO | WO-2014/153577 A1 | 10/2014 |

* cited by examiner

MULTIFUNCTIONAL TRACTION OR CARRIER VEHICLE

CROSS-REFERENCE TO RELATED APPLICATIONS

This application is a Continuation of and claims the benefit of priority under 35 USC 120 to PCT/EP2018/080815 filed Nov. 9, 2018, which claims priority to DE 10 2017 126 475.2 filed Nov. 10, 2017, the entire contents of each are hereby incorporated by reference.

The present disclosure relates to a vehicle. A tractor is a vehicle used in agriculture for hauling and driving agricultural machinery. Apart from in agriculture, tractors are used in forestry, municipal operations, horticulture, at airports and in construction (road building, earth moving and landscaping). As a rule tractor gearboxes have several gear increments. The extremes on the market range from eight forward and four reverse gears up to 72 forward and reverse gears. Hydromechanical gearboxes are also available, which irrespective of the engine speed and without interruption in power flow allow infinitely variable towing speeds of around 20 metres per hour to 60 km/h.

Differential locks are fitted as standard, so that when the wheels of an axle differ in road grip the wheel with the lesser road grip does not slip to the extent of spinning, while the other wheel on less skid-prone ground is decelerated through to standstill due to the action of the unlocked differential. There are also different designs of differential lock in tractors, for example partly automatic meshing as a self-locking differential, partly manual activation by switch or pedal. The differential locks used also differ in respect of locking action. Sometimes they rigidly connect both wheels of an axle, so that complete locking action results. Other designs allow a certain amount of wheel slip. As a rule modern tractors are equipped with selectable all-wheel drive. All-wheel drive widely has what is known as advancement. Here the front wheels attain a driving speed roughly two percent higher than the rear wheels, thus preventing distortion in the gearbox when cornering. The inevitably occurring slip is tolerable as long as no road driving or work at speeds of over 15 km/h take place.

The kinetic energy (rotation) generated by the engine is transferred to the attached/add-on equipment by way of crankshaft and power take-off transmission. In the standard (engine) power take-off there is a switch to a speed of 540 or 1000 revolutions per minute via an intermediate gearbox as required. This is normally within optimum engine performance at an engine speed of around 2000 rpm. So-called economy or ECO power take-off speeds are also available. They have already attained the rated speed of 540 or 1000 at a fuel-efficient 1600 rpm and are suitable for lighter drive work, e.g. for tedders. A special case is the rated speed of 430, which is reached at 2000 rpm. This speed of rotation, which is supplied mainly in mountain regions, allows the slow drive of a self-loading trailer at the rear while at the same time reaching the full 1000 rpm of the front power take-off shaft.

In the case of devices connectable to a utility vehicle, a distinction is made between add-on units, which are (flexibly) attached, for example to a three-point hydraulic system, and mounted units, which are rigidly (very robustly) connected to the frame. In the case of add-on units a distinction is made between units which are merely pulled or pushed, e.g trailers, seed drills, harrows, ploughs, cultivators, levelling blades, tankers, slurry spreaders, rollers, and units which are simultaneously pulled or supported by the tractor and driven hydraulically or via the power take-off shaft, such as forklift attachments, balers, fertiliser spreaders, rotary harrows, defoliators for removing foliage from deciduous trees and shrubs in nurseries, field choppers, milling cutters, front-end loaders, feed mixer wagons, sweepers, combine harvesters, or units driven via the power take-off shaft or hydraulics while the tractor is immobile, e.g. tree diggers, earth augers, wood splitters, circular saws, vacuum pumps for manure or slurry, water pumps, slurry mixers, milking machines.

Mounted units are found, for example, in vehicles with forestry-specific or municipal equipment (e.g. harvester arms, winches, tumbler blades, mounted cranes or diggers, outrigger mowing equipment). Tractors of this kind represent a transition to specialist machinery such as special forestry machines with articulated steering. Today many items of equipment which were previously driven by a tractor are themselves so large and specialised that they have become widespread as independent self-propelled machines, e.g. combine harvesters, foragers, grubbers or specialist forestry machines (harvesters, forwarders).

A new development is for add-on units to be connected to a tractor via the ISOBUS bus system. Control of the units can then consistently be effected via a bus terminal integrated in the tractor, without a separate controller having to be installed in the tractor for each unit. It is also possible to retrofit older tractor models with bus terminals. Due to the arrangement of engine and transmission, in most agricultural utility vehicles or tractors the full engine power can only be released rearwards to the traction drive or the rear power take-off by a flywheel. The power for a front power take-off is tapped at the front of the engine and in principle is generally restricted to approximately 30% of the engine power.

In the municipal, agricultural or forestry sector are known numerous trailers, add-on units and attachable tools which perform differing tasks, for example snow ploughs, snow blowers, sweepers, mowers, and the like. On the farm the various add-on units and mounted units, and as a rule a range of different vehicles, are provided with various hitching and coupling systems which have a coupling device for the different trailers and attachments. For example, drawbars or three-point linkages are common. Here the different trailers and attachments often have very different requirements for the hitching and coupling systems, for example because certain trailers should have an articulated coupling and others, such as snow ploughs, should be rigidly attached to the vehicle.

A utility vehicle is disclosed in AT 514 147 B1. Here provision is made for the vehicle to include a mid-mounted engine and a gearbox arranged beside the mid-mounted engine. The mid-engine and the gearbox are operatively connected by means of a geared connection, wherein the mid-engine, the gearbox and the geared connection are arranged in a U-shape. The geared connection may, for example, be designed as a belt drive or chain drive, or as a chain of gear wheels which transfer the torque from the mid-engine to the gearbox. Here the geared connection and the gearbox may form one transmission unit.

The vehicle may have a centrally arranged power take-off shaft and/or a drive shaft which are operatively connected with a contacting means, wherein the torque of the power take-off and/or the drive shaft can be transferred to an add-on module by the contacting means. The load-bearing parts of vehicles are designated as the underbody, frame, chassis or undercarriage. The function of load-bearing parts is to support the drive, the bodywork and the payload, and to stabilize against external forces. In vehicles with self-supporting bodywork the bodywork is the supporting member. The wheel suspension, all the essential drive elements such as gearbox and engine, if appropriate the bodywork or cargo bed and trailer couplings are fixed to the chassis. A chassis with a frame can also be roadworthy without bodywork.

On tractors, due to the limited front surface of the bonnet, the radiators (typically: cooling water radiator, intercooler, gearbox cooler, hydraulic cooler) as well as the air conditioning condenser, are arranged in series in the cooling airflow. Because of the ever-increasing cooling air inlet temperatures, coolers need to be of correspondingly larger size. A device for cleaning is provided in order to unfold the individual cooling registers for cleaning (appropriate tubing and mechanism required). All the coolers are ventilated by a fan, the independent needs-based, regulation of the fan is not possible (→increased power and fuel requirement).

SUMMARY OF THE DISCLOSED SUBJECT MATTER

The object of the present disclosure is to provide a tractor and carrier vehicle which is compact, multifunctional and/or preferably suitable for hilly terrain, in particular for agricultural and municipal usage.

The vehicle according to the disclosure is characterized in that a vehicle chassis of this vehicle includes a frame with a tubular member, a gearbox housing and an underbody. The frame, the gearbox housing and the underbody are connected in such a manner that they form the vehicle chassis and hence a supporting frame for engine, bodywork and/or payload.

The vehicle chassis is designed to support the engine, accessories, bodywork and payload, and to stabilize these components against external forces. Wheel suspension, an engine, bodywork, a cab and/or coupling means may be fixed to the vehicle chassis. In the context of the present disclosure a coupling means is understood to be part of a coupling device for connecting a vehicle to an add-on unit, wherein on each vehicle and add-on unit are provided correspondingly designed coupling means which together form the coupling device. In the following a coupling device is also called a docking device, and a coupling means is also designated as a docking plug-in module and docking receiver. Coupling means of this kind can essentially be from known equipment in prior art, for example the contacting means disclosed in AT 514 147 B1.

According to the disclosure the gearbox housing forms the central load-bearing member of the vehicle or vehicle chassis. The front and rear axle can be attached to the gearbox housing by means of an appropriate connecting structure, e.g. a central tubular module. The vehicle chassis or load-bearing structure of the vehicle therefore comprises three elements which may be directly or indirectly connected to each other and arranged vertically above one another on three different levels, namely the plate-type underbody, the gearbox housing and the frame.

According to the disclosure tubular members of the frame are advantageously designed as compressed air reservoirs for at least one pneumatic means. The frame can therefore form an enclosed airtight compressed air reservoir and be used multifunctionally in a space-saving manner. The fact that the frame or parts of the frame are designed as a compressed air reservoir fulfils two functions, firstly helping to stabilize the chassis and secondly saving the space for a separate compressed air reservoir in the vehicle. In particular it can be envisaged that the frame is connected to the gearbox housing and/or preferably the underbody by a coupling means positioned at the front in the longitudinal direction of the vehicle and/or at the rear in the longitudinal direction of the vehicle.

With reference to a centre axis extending in the longitudinal direction of the vehicle the gearbox can be arranged approximately to the side of the centre axis in a central region of the vehicle. In the context of the present disclosure this side of the vehicle is designated the gearbox side. A drive section of the gearbox can be arranged roughly centrally in the centre of the vehicle in such a manner that the gearbox is designed to drive a drive shaft extending in the direction of the centre axis and/or a power take-off shaft extending in the direction of the centre axis. An engine of the vehicle may be arranged in the longitudinal direction of the vehicle centrally adjacent to the gearbox on a side of the centre axis opposite the gearbox side, with this side of the vehicle being designated the engine side in the context of the disclosure. Arranging gearbox and engine in this way gives the vehicle an extremely compact structure.

A particularly compact design can be achieved due to the advantageous arrangement of the engine as a mid-engine and of the gearbox in the centre of the vehicle. Even when coupling devices are provided in the front region and rear region, this compact design means that it is possible to achieve a short overall length of the vehicle which does not exceed, or is even less than, the overall length of a comparable traditional vehicle. On the engine side at least an engine radiator and/or preferably an intercooler may be arranged, with air-aspirating end walls of this/these cooling means extending in the longitudinal direction of the vehicle.

A gearbox cooler and/or a cooler for hydraulic equipment may be arranged on the gearbox side, with air-aspirating end walls of this/these cooling means likewise extending in the longitudinal direction of the vehicle. The cooling means on the engine side and on the gearbox side are preferably arranged with their end walls adjacent to one another in the longitudinal direction of the vehicle. The connections between the cooling means and the components to be cooled are thereby relatively short. This also gives the vehicle an extremely compact structure. This kind of arrangement of the vehicle's cooling means is advantageous in that in operation they do not become clogged or soiled by contaminants of any nature, for example snow, dust, dirt, cut biological material such as grass, leaves or the like, and can therefore always provide the cooling air essential for cooling down the individual items of equipment.

The cooling means and their fans can, moreover, be regulated independently of one another, i.e. the cooling means can be independently regulated to give optimum performance. The folding mechanism of the cooling means can be dispensed with, as these are ideally accessible for cleaning because of their arrangement. This kind of arrangement of the cooling means also allows free access to power take-off connecting means and/or drive shaft connecting means arranged in a front and/or rear region of the vehicle. In addition this enables power take-off and drive shafts to run axially from the rear to the front of the vehicle through the gearbox without the engine or other units being in the way. The front power take-off shaft does not therefore need to be tapped at the engine. Furthermore, fans of the cooling means may be designed as reversible fans to blow dirt out of cooler elements of the cooling means. For this purpose provision may be made for a controller to activate the fans to blow dirt out at set intervals.

In one direction of travel the engine is installed in the longitudinal direction of the vehicle and arranged beside the gearbox. The gearbox may drive a drive shaft extending in the longitudinal direction of the vehicle as well as a power take-off shaft likewise extending in the longitudinal direction of the vehicle. This means that engine and gearbox are arranged parallel to the longitudinal direction of the vehicle in the central region of the vehicle, giving the vehicle a central low center of gravity. The full engine power both at the traction drive at a front or rear power take-off or even at pump auxiliary drives can thereby be taken off by way of the transverse drive. The gearbox is designed in such a manner that transverse drive, power take-off coupling, auxiliary drives, VTB stepless transmission, high-low transmission and longitudinal differential are integrated in the gearbox housing combination. As already indicated above, the gearbox housing is the load-bearing part of the chassis. The vehicle motor may preferably be rigidly connected to the gearbox housing at a flywheel housing and additionally supported at the front by a bracket mounted to the side of the gearbox housing.

The vehicle chassis may extend over three levels arranged vertically above one another, wherein the underbody can be provided at a lower level, the gearbox housing at mid-level and the frame at an upper level. The frame is preferably connected to the gearbox housing and the underbody by way of the front and rear coupling means. The coupling means may therefore be part of the load-bearing structure. The coupling means may be connected with a front and rear axle or with a corresponding central tubular module. The underbody may be connected, preferably bolted, to a front coupling means, the front axle, the rear axle and to a rear coupling means. The fact that the vehicle according to the disclosure is virtually mirror symmetrical and of extremely compact design means that, for example, by turning a vehicle seat, with the appropriate operating equipment or by turning the entire cab, the vehicle can be driven and used in any direction.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN
EXEMPLARY EMBODIMENT

Figure 1:
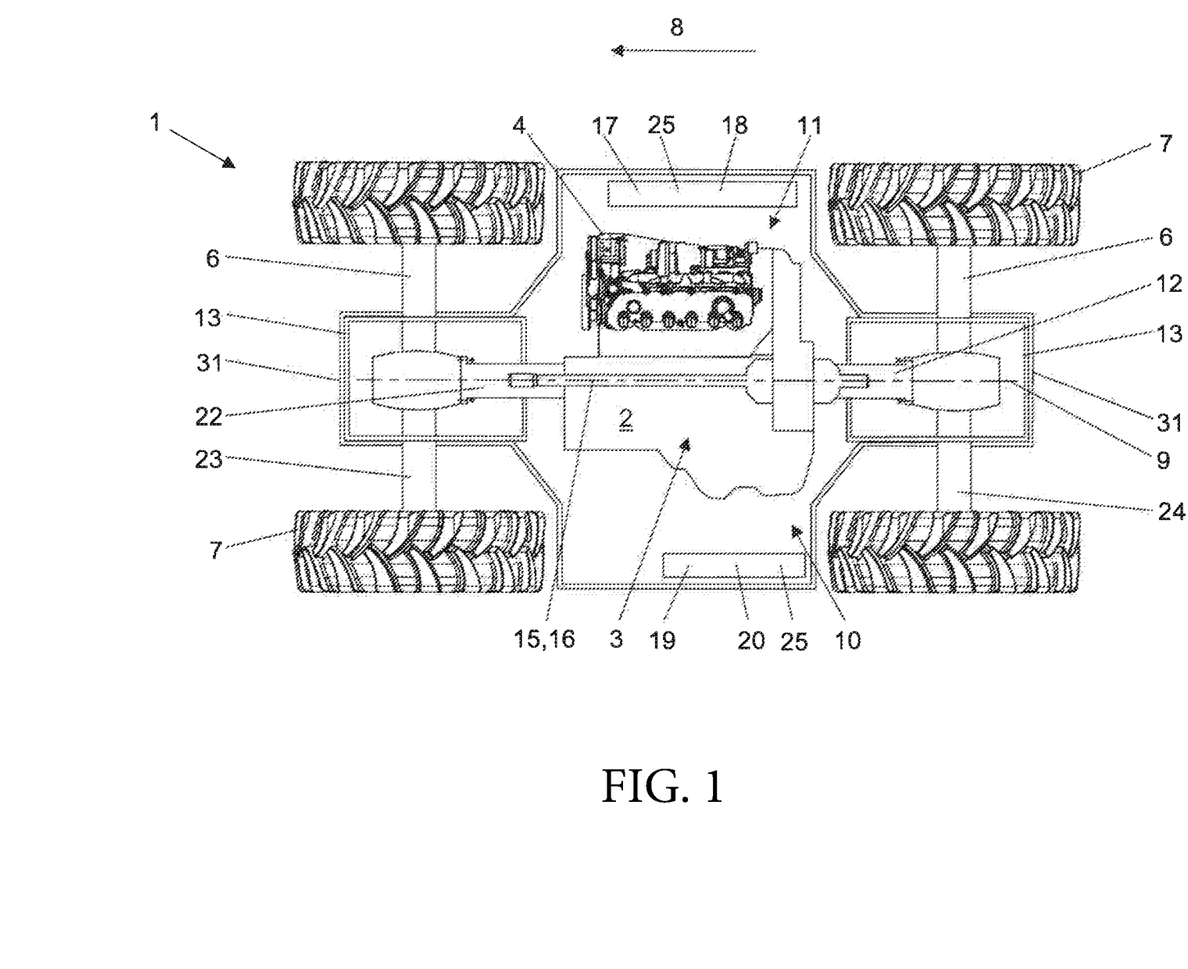
FIG. 1: a schematic plan view of a multifunctional tractor and carrier vehicle suitable for use on hilly terrain according to the disclosure.
Figure 2:
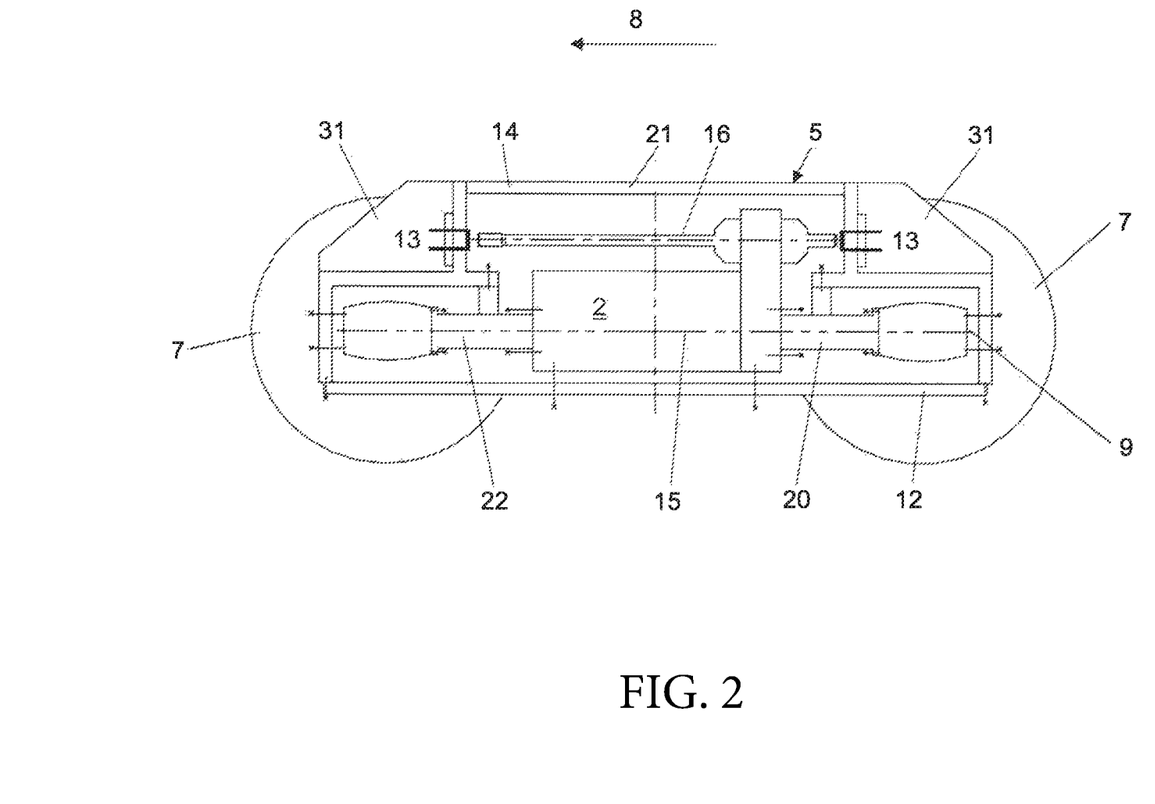
FIG. 2: a schematic laterally fragmented representation of the chassis of the vehicle according to the disclosure.
Figure 3:
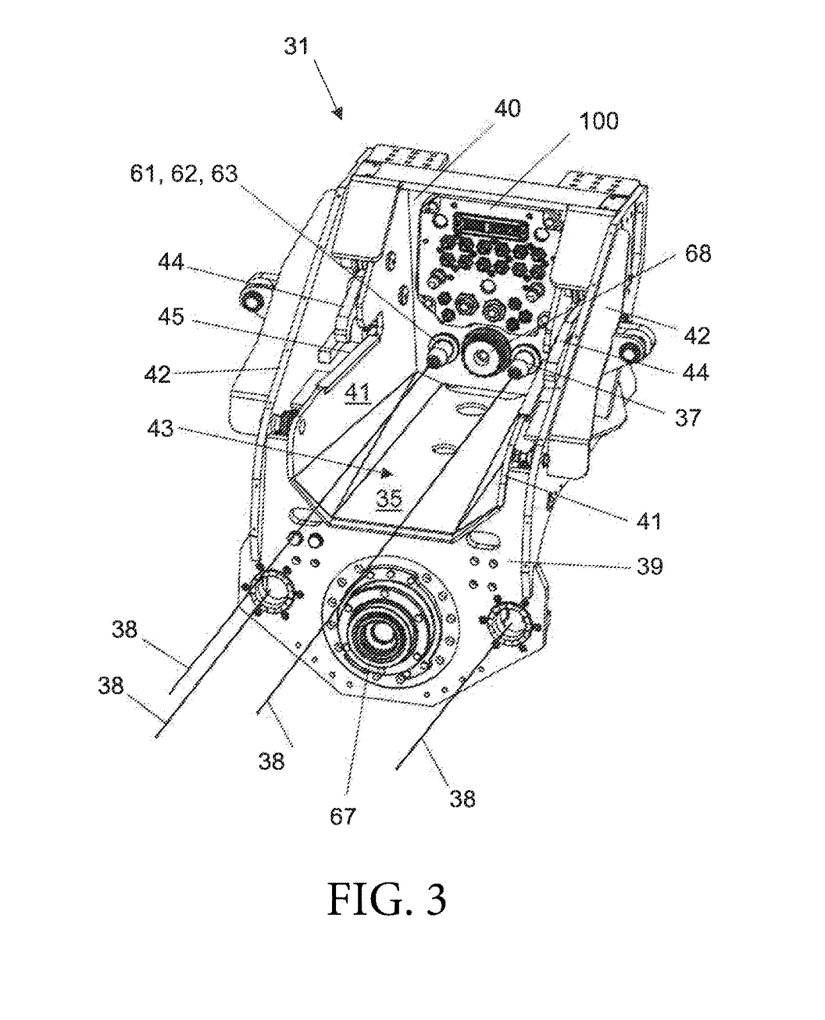
FIG. 3: a perspective view of a docking receiver.
Figure 4:
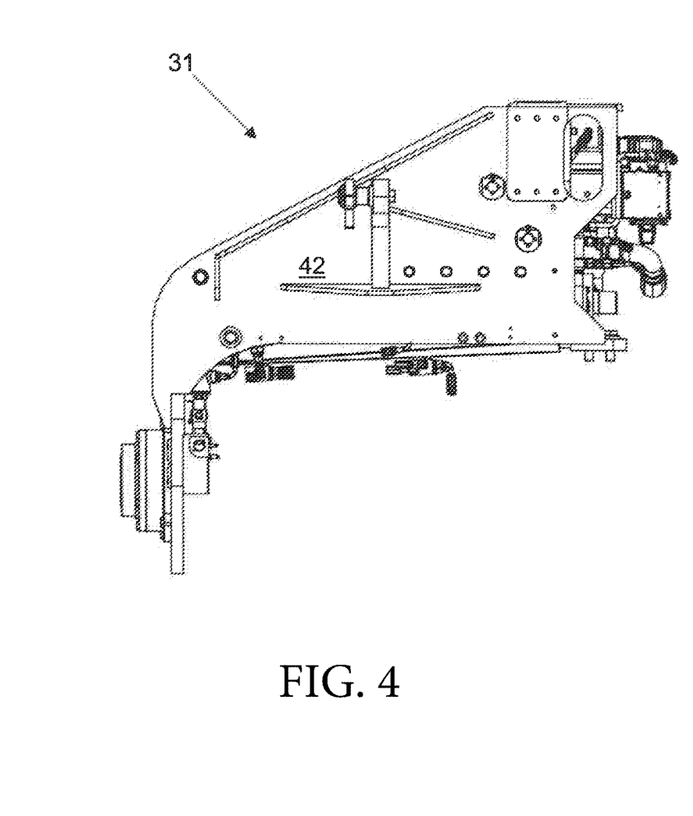
FIG. 4: a lateral plan view of the docking receiver.
Figure 5:
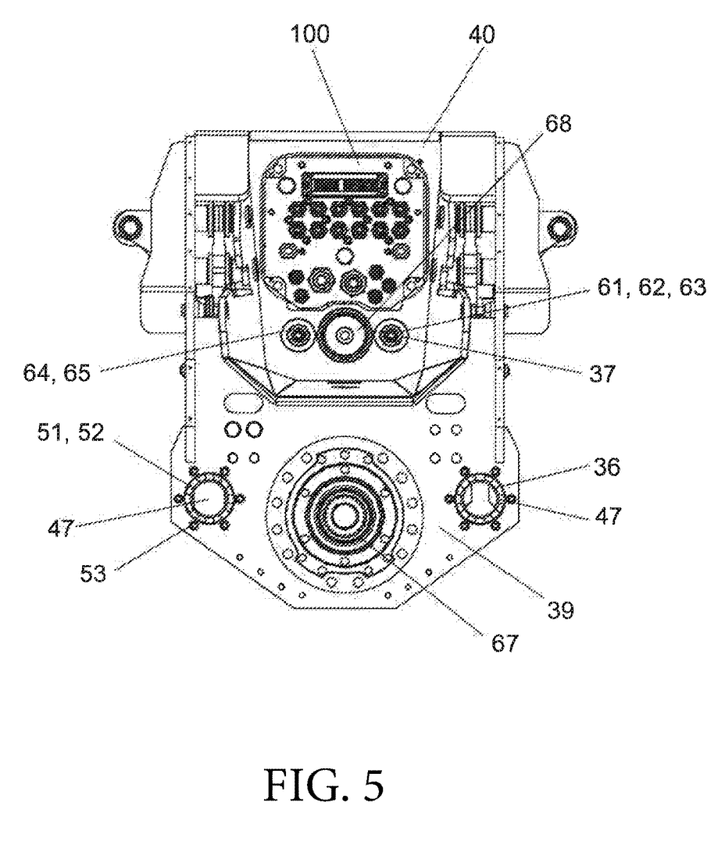
FIG. 5: a plan view of the docking receiver from the front.
Figure 6:
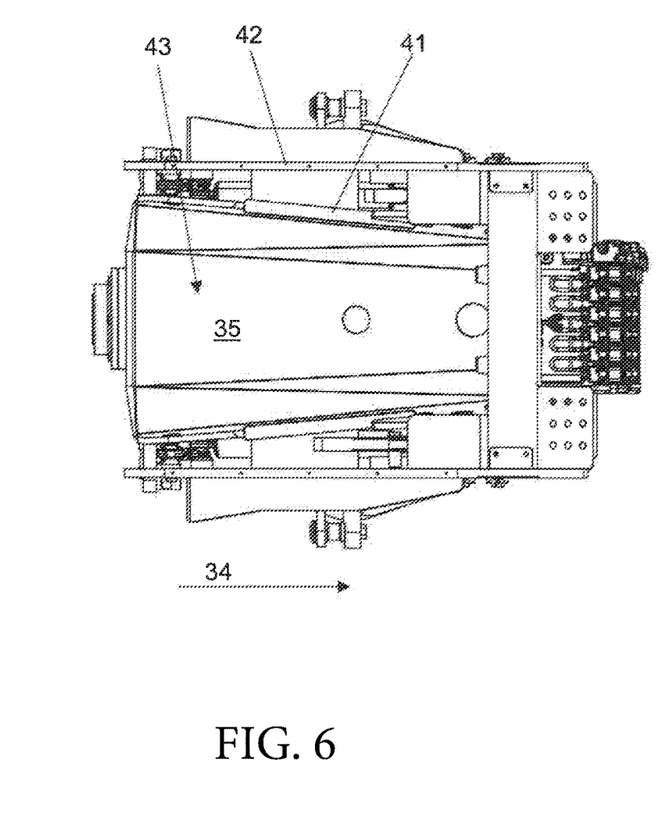
FIG. 6: a plan view of the docking receiver from above.

The vehicle 1 according to the disclosure may, for example, be designed with all-wheel drive and includes a gearbox 3 provided in a gearbox housing 2, an engine 4, a vehicle chassis 5 and two axles 6 connected thereto, each with two wheels 7. With reference to a centre axis 9 extending in the longitudinal direction of the vehicle 8 the gearbox 3 is arranged approximately to the side of the centre axis in a central region of the vehicle 1. This side of the vehicle is designated the gearbox side 10.

The engine 4 is arranged in the longitudinal direction of the vehicle 8 centrally adjacent to the gearbox 3 on a side of the centre axis 9 opposite the gearbox side 10. This side of the vehicle 1 is designated as the engine side 11. Vertically underneath the gearbox housing is provided a plate-type underbody 12 which is connected to the gearbox housing. In the longitudinal direction of the vehicle 8 at the front and in the longitudinal direction of the vehicle 8 at the rear the underbody 12 is connected to a frame 14 by a coupling means 13. The gearbox 3 and the gearbox housing 2, the underbody 12 connected thereto and the frame 14 form the vehicle chassis 5.

A drive section of the gearbox is arranged roughly centrally in the centre of the vehicle in such a manner that the gearbox 3 is designed to drive a drive shaft 15 extending in the direction of the centre axis and a power take-off shaft 16 provided vertically above it and also extending in the direction of the center axis 9. Drive shaft 15 and power take-off shaft 16 thus extend axially on either side of the gearbox through the vehicle 1 from rear to front. An engine radiator 17 is arranged on the engine side 11, with an air aspirating end wall of the engine radiator 17 extending in the longitudinal direction of the vehicle 8. An intercooler 18 is arranged on the engine side, with an air-aspirating end wall of the intercooler 18 likewise extending in the longitudinal direction of the vehicle 8. The engine radiator 17 and the intercooler 18 are arranged adjacent to one another in the longitudinal direction of the vehicle.

A gearbox cooler 19 is arranged on the gearbox side 10, with an air-aspirating end wall of the gearbox cooler 19 extending in the longitudinal direction of the vehicle 8. A cooler for hydraulic equipment is arranged on the gearbox side 10, with an air aspirating end wall of the cooler 20 for hydraulic equipment likewise extending in the longitudinal direction of the vehicle 8. The frame 14 comprises at least one tubular member designed as a compressed air reservoir 21 for the pneumatic equipment of the vehicle 1.

At the front and rear the gearbox is connected by way of central tubular modules 22 to a front axle 23 and a rear axle 24. The central tubular modules 22 are preferably part of the load-bearing structure of the chassis together with the underbody 12 and the frame 14. These axles 6, 23, 24 are designed as swing axles with hydro-pneumatic suspension. Provision is also made for a permanent all-wheel drive with a longitudinal lock and transverse differential locks in the axles 6. The vehicle 1 preferably has all-wheel steering. The power of the engine 4 is, for example, approx. 220 kw to 340 kw. The length of the wheelbase or the distance between the front and rear axle is, for example, approx. 3300 mm. The unladen weight is approx. 11,500 kg. The axle load is around 10,500 kg.

The gearbox 3 is envisaged as a hydraulically/mechanically power-split gearbox with an infinitely variable transmission ratio. In a slow driving mode speeds of 0 to 60 km are possible, and in a fast driving mode 0 to 80 km. The maximum towing force can, for example, be up to bis 136 kN. It is further possible to connect to the vehicle any add-on units or work modules having an appropriate coupling means, for example a docking plug-in module via the on-board coupling means, e.g. a docking receiver of the vehicle. The engine power take-off shaft, which is connectable to the add-on units at the front and rear of the vehicle, rotates at 1,000 revolutions per minute and a torque of 3,000 Nm.

Due to the fact that the engine power take-off is designed to pass through the entire vehicle, it is possible for the first time to provide the full power take-off shaft output both at the front of the vehicle as well as the rear. The performance of the front power take-off shaft in known vehicles is considerably weaker. Provision is also made for a hydraulic pump of, for example, 180 l per minute at 210 bar and up to 360 l per minute as an option. According to another embodiment the coupling means may be a structural component of the car chassis with a load-bearing function. In addition to absorbing external forces introduced by add-on units, the coupling means also absorbs the chassis forces of axle steering and suspension cylinders, and is provided at least at the front and rear of the vehicle and connected to the underbody paneling and the frame in order to form the vehicle chassis.

The vehicle has suspension cylinders with piston accumulators. The latter are mounted on the side wall in order to create the shortest possible conduction paths to the suspension cylinders, this having a positive impact on the suspension's response behavior (short lines—low flow resistance). In the insertion direction at the front are provided symmetrically and structurally identically two receivers for steering cylinders or reset cylinders on the back of a docking plate arranged at the rear and in reverse at the front of a vehicle. Vehicles licensed for up to 50 km/h preferably have a steering cylinder on the front axle. Vehicles licensed for up to 80 km/h preferably have two steering cylinders on the front axle.

On one side of a rear axle a steering cylinder is installed and a reset cylinder is installed on the other side. The reset cylinders are preloaded by means of a membrane reservoir and ensure that the axle is set to run in a straight line should a rear axle steering system fail. By providing a docking receiver it is possible to connect numerous add-on units to the basic vehicle. Such a docking receiver 31 (coupling means) of a docking device 30 (coupling device) to receive a docking plug-in module 32 (coupling means) is described below. The docking receiver 31 comprises a roughly U-shaped pre-centering means 33 with an insertion pan 35 roughly conically tapering in an insertion direction 34 to pre-centre a docking plug-in module 32 corresponding in design to the docking receiver.

At least a first and second centering means 36, 37 are further provided at the docking receiver 31, wherein the first and second centering means 36, 37 each comprise two coupling members and/or counter-coupling members for connecting to corresponding coupling members and/or counter-coupling members of a docking plug-in module 32. The first and second centering means 36, 37 for centering the docking plug-in module 32 with reference to the docking receiver 31 are furthermore designed along four centering axes 38 corresponding to the four coupling and counter-coupling members in one of the insertion direction 34.

The docking receiver 31 additionally comprises a drawing-in means with two hydraulically actuated catch hooks 44 for drawing the docking plug-in module 23 into the docking receiver 31 in the insertion direction 34. The docking receiver 31 includes two docking walls 39, 40 extending vertically and arranged horizontally offset to each other. These two docking walls 39, 40 are connected by an insertion pan 35 extending in a roughly horizontal direction. Accordingly a first docking wall 39 is arranged vertically in the region below the insertion pan 35 and a second docking wall is arranged as a delimitation of the insertion pan 35 in a horizontal direction above the insertion pan 35.

The insertion pan assumes the function of pre-centering when a docking plug-in module is inserted into the docking receiver by receiving a body of the docking plug-in module 32 designed to correspond with the insertion pan 35. In the context of the present disclosure an insertion direction is defined as a direction which extends roughly horizontally and in which a docking plug-in module is inserted into a docking receiver. To pre-center the docking plug-in module 32 when it is inserted in the docking receiver 31 the geometry of the insertion pan 35 tapers in the insertion direction 34 to allow pre-centering of the docking plug-in module.

Transversely to the insertion direction on both sides of the insertion pan 35 roughly transversely to the insertion direction 34 provision is made for internal and external side walls 41, 42 extending roughly vertically. These internal and external side walls 41, 42 are arranged at a predetermined angle in the insertion direction 34 in such a manner that a receiving space 43, limited by the internal side walls 41 and the insertion pan 35, tapers in the insertion direction.

In the internal side walls 41 are formed catch recesses/catch pin guides 45 provided to guide and receive corresponding formed catch hooks/catch pins on a docking plug-in module 32. In the internal and external side walls 41, 42 shafts on which the catch hooks 44 are pivoted are arranged in corresponding drillings. The catch hooks are therefore arranged in a catch hook space delimited by the internal and external side walls. The catch hooks can be activated by corresponding catch hook cylinders 46.

In the region of the first docking wall 39 are provided roughly sleeve-form centering pin receivers 47 (counter-coupling members), which form the first centering means 36 of the docking receiver 31. In the insertion direction 34 is firstly provided the first docking wall 39, which has two drillings 48 to receive the sleeve-form centering pin receivers 47. The sleeve-form centering pin receivers 47 are arranged in the drillings 48. The sleeve-form centering pin receivers 47 are therefore arranged in the insertion direction 34 behind the first docking wall 39. In the insertion direction 34 the sleeve-form centering pin receivers 47 comprise a tubular insertion/centering section 49 and a securing section 54.

The tubular insertion/centering section 49 has a conically tapering insertion recess 50, wherein a vertical end face arranged against the insertion direction 34 projects from the first docking wall 39 and forms a first axial stop face 51 of a first stop means 52. In this circular first stop face 51 are formed radially-running and equally spaced debris discharge slots 53 to receive and remove contaminants. These kinds of contaminant would alter the position of the stop. This is disadvantageous in that an exact coupling is not possible between docking receiver and docking means. The tubular insertion/centering section 49 has a cylindrical centering recess 55 connecting in the insertion direction 34 to the insertion recess 50.

On a circular end face positioned against the insertion direction 34 the tubular securing section 57 has drillings 56 to connect with the first docking wall 39, for example by means of appropriate bolted connections. This end face has a larger diameter than the tubular insertion/centering section 49, thereby forming a radially-running stop shoulder which prevents movement of the sleeve-form centering recess against the insertion direction 34.

The locking bodies are received from the rear in a cylindrical drilling and have a flange which is supported on the back of the first plate. The advantage of this design is that the longitudinal force firstly applied by add-on units and secondly overlaid by the wedge force of the wedge forks, need not be introduced into the docking recess by way of a screw assembly.

Furthermore, in the tubular securing section 57 are present vertically extending slots 58 to receive hydraulically actuated wedge forks 59. The wedge forks 59 are provided for fixing a corresponding centering pin of a docking plug-in module 32 and are vertically movable from a release position to a fixing position. The wedge forks 59 therefore form an axial securing means 60.

In roughly the center of the first docking wall 39 is provided a drive shaft connection means in the region between the two sleeve-form centering pin receivers 47. A drive shaft connection means is part of a drive shaft connection device for connecting the on-board end of a drive shaft with the end of a drive shaft on the add-on unit. In the second docking wall 40 is formed a recess 66 to receive a coupling plate 100 for the provision of electric, electronic, hydraulic and/or pneumatic connections between a vehicle and an add-on unit. The coupling plate 100 with a flange-mounted valve block can very quickly and easily be disassembled for repair purposes by loosening only four bolts against the insertion direction 34. In the transverse direction the coupling plate 100 might have some play, but in operation it is axially fixed to the docking means.

Furthermore, in the region of the second docking wall 40 are provided two centering pins 61 (coupling members) extending against the insertion direction 34, which form the second centering means 37 of the docking receiver 31. In the insertion direction the centering pins 61 have a conical insertion section 62 and a cylindrical centering section 63 connected thereto. A circular vertical end face positioned at the front in the insertion direction 34 connecting to the centering section 63 forms a second stop face 64 of a second stop means 65.

The coupling members and/or the counter-coupling members of the first and second centering means thus form at least two axial stop means which limit relative movement between docking receiver and docking plug-in module in the insertion direction. The stops are preferably formed on the first and/or second centering pin and/or the first or second centering recess extending in a plane vertical to the insertion direction circular stop faces.

Roughly in the center of the second docking wall 40 a power take-off shaft connection means 68 is provided in the region between the two centering pins 66. A power take-off shaft connection means 68 is part of a power take-off shaft connection device for connecting the on-board end of a power take-off shaft with the end of a power take-off shaft on the add-on unit.

The docking receiver is positioned above a large machined drilling approx. 258 mm in diameter in the first plate on a centering spigot on a central pipe flange of an axle centre section. This precision makes it possible to use a connecting shaft with toothed sleeves for connecting the power take-off shaft drive of the gearbox and the power take-off shaft connection means. This obviates the need for a connection using a cardan shaft, which is expensive and, above all, not maintenance-free.

The vehicle according to the disclosure has a driver's cab with a variable cockpit. So that these numerous add-on units can also be optimally operated from the driver's cab, provision is made for all the electric, hydraulic and pneumatic working groups to be controlled either by way of the existing controls (armrest on the right, joystick on the left) or by external controllers. Examples of external controls or actuating means are switches/buttons, joysticks, displays, etc. These electrical signals may be transmitted through the modular connector system in the cab and thus passed on to the add-on unit. Here a distinction is made between two different operating methods. Operation by way of the joystick and/or the arm rest. The user input is converted by the vehicle into the requested signals of the add-on unit. The corresponding visualization appears on a display means in the driver's cab.

Control using OEM and/or external control: Input devices are plugged into the existing connectors; the signals are transmitted direct to the docking add-on unit; Output devices are plugged into the existing connectors and communicate directly with the add-on unit. Combinations of both the aforementioned methods are also possible. The advantage of the disclosure is that a very compact vehicle is created which can be employed in a great variety of ways while delivering very high performance, and in addition can provide optimum power both at the front and the rear.

LIST OF REFERENCE NUMERALS 1 vehicle
2 gearbox housing
3 gearbox
4 engine
5 vehicle chassis
6 axle
7 wheels
8 longitudinal direction of vehicle
9 centre axis
10 gearbox side
11 engine side
12 underbody paneling
13 coupling means
14 frame
15 drive shaft
16 power take-off shaft
17 engine radiator
18 intercooler
19 gearbox cooler
20 cooler for hydraulic equipment
21 compressed air reservoir
22 central tubular module
23 front axle
24 rear axle
25 cooling means
30 docking device
31 docking receiver
32 docking plug-in module
33 precentering means
34 insertion direction
35 insertion pan
36 first centering means
37 second centering means
38 centering axis
39 first docking wall
40 second docking wall
41 internal side wall
42 external side wall
43 receiving space
44 catch hook
45 catch pin guide
46 catch hook cylinder 47 centering pin receiver
48 drilling
49 insertion/centering section
50 conical insertion opening
51 first axial stop face
52 first stop means
53 debris discharge slots
54 tubular centering section
55 cylindrical centering recess
56 drilling
57 securing section
58 slots
59 wedge fork
60 axial securing device
61 centering pin
62 insertion section
63 centering section
64 second stop face
65 second stop means
66 recess
67 drive shaft connecting means
68 power take-off shaft connecting means
69 catch recesses

The invention claimed is:

1. A multifunctional tractor and carrier vehicle (1) with a vehicle chassis (5), wherein the vehicle chassis (5) comprises:
   an underbody (12) of plate-form design,
   a gearbox (3) arranged in a gearbox housing (2) connected to the underbody (12), and
   a frame (14) which is connected to the underbody (12) and/or the gearbox housing (2) and which comprises tubular members, wherein
   the underbody (12), the gearbox housing (2) and the frame (14) form a load-bearing structure of the vehicle,
   a drive shaft (15) and a power take-off shaft (16) which extend axially on either side of the gearbox (3) through the carrier vehicle (1) from rear to front, and
   an engine (4), wherein the engine (4) and the gearbox (3) are arranged parallel to each other and each are arranged in a longitudinal direction of the vehicle (8).

2. The vehicle of claim 1, wherein at least one tubular member of the frame (14) is designed as a compressed air reservoir (21) for at least a pneumatic means of the vehicle.

3. The vehicle of claim 1, wherein a center axis (9) extends in the longitudinal direction of the vehicle, and the gearbox (3) is arranged approximately to the side of the center axis (9), wherein this side is designated as the gearbox side (10), and a drive section of the gearbox is arranged centrally in the center of the vehicle so that the gearbox (3) is designed to drive a drive shaft (15) extending in the direction of the center axis (9) and/or a power take-off shaft (16) extending in the direction of the center axis (9), and
   wherein the engine (4) of the vehicle is arranged in the longitudinal direction of the vehicle (8) centrally adjacent to the gearbox (3) on a different side of the center axis (9), this side of the vehicle being designated as the engine side (11).

4. The vehicle of claim 3, wherein on the engine side (11) are arranged an engine radiator (17) and/or an intercooler (18), the end walls of which extend in the longitudinal direction of the vehicle (8).

5. The vehicle of claim 3, wherein on the gearbox side (10) are arranged a gearbox cooler (19) and/or a cooler for a hydraulic equipment (20), the end walls of which extend in the longitudinal direction of the vehicle (8).

6. The vehicle of claim 1, wherein the vehicle chassis (5) extends over three levels arranged vertically above one another, wherein the underbody (12) is provided at a lower level, the gearbox housing (2) at mid-level and the frame (14) at an upper level.

7. The vehicle of claim 1, wherein the underbody (12) is connected to the gearbox housing (2) and the underbody (12) is connected to the frame (14) by way of a coupling device (13), the coupling device (13) being a docking receiver, positioned at the front in the longitudinal direction of the vehicle (8) and/or at the back in the longitudinal direction of the vehicle (8).

8. The vehicle of claim 1, wherein a central tubular module (22) is arranged between the gearbox housing (2) and each of a front axle (23) and a rear axle (24).

9. The vehicle of claim 8, wherein the central tubular modules (22) are load-bearing parts inside the chassis (5) of the vehicle.

* * * * *